(12) United States Patent
Lazoglu et al.

(10) Patent No.: US 11,435,244 B2
(45) Date of Patent: Sep. 6, 2022

(54) FORCE SENSOR FOR MEASURING STATIC AND DYNAMIC FRICTION COEFFICIENTS

(71) Applicant: KOC UNIVERSITESI, Istanbul (TR)

(72) Inventors: Ismail Lazoglu, Istanbul (TR); Abbas Hussain, Istanbul (TR); Sarmad Shams, Istanbul (TR)

(73) Assignee: KOC UNIVERSITESI, Istanbul (TR)

( * ) Notice: Subject to any disclaimer, the term of this patent is extended or adjusted under 35 U.S.C. 154(b) by 51 days.

(21) Appl. No.: 16/767,139

(22) PCT Filed: Nov. 30, 2017

(86) PCT No.: PCT/TR2017/050616
§ 371 (c)(1),
(2) Date: May 27, 2020

(87) PCT Pub. No.: WO2019/108144
PCT Pub. Date: Jun. 6, 2019

(65) Prior Publication Data
US 2020/0386634 A1 Dec. 10, 2020

(51) Int. Cl.
*G01L 1/24* (2006.01)
*G01L 1/04* (2006.01)
*G01L 1/22* (2006.01)
*G01N 19/02* (2006.01)

(52) U.S. Cl.
CPC ............ *G01L 1/24* (2013.01); *G01L 1/04* (2013.01); *G01L 1/2206* (2013.01); *G01N 19/02* (2013.01)

(58) Field of Classification Search
CPC ......... G01N 18/02; G01L 1/24; G01L 1/2206; G01L 1/04
See application file for complete search history.

(56) References Cited

U.S. PATENT DOCUMENTS

| | | | | |
|---|---|---|---|---|
| 3,837,222 A | * | 9/1974 | Raskin | G01G 3/1402 73/862.632 |
| 4,326,424 A | * | 4/1982 | Koenig | G01L 5/0019 73/862.633 |
| 5,115,664 A | * | 5/1992 | Hegde | G01N 19/02 360/137 |
| 5,377,525 A | * | 1/1995 | Hutchinson | G01N 19/02 73/10 |
| 5,501,097 A | * | 3/1996 | Nomura | G01N 19/02 73/9 |
| 5,795,990 A | * | 8/1998 | Gitis | G01N 3/56 73/10 |
| 5,861,954 A | * | 1/1999 | Israelachvili | G01N 19/02 356/496 |

(Continued)

FOREIGN PATENT DOCUMENTS

| | | |
|---|---|---|
| JP | H0318741 A | 1/1991 |
| JP | H1062273 A | 3/1998 |
| KR | 20140125059 A | 10/2014 |

*Primary Examiner* — Tran M. Tran
(74) *Attorney, Agent, or Firm* — Bayramoglu Law Offices LLC

(57) ABSTRACT

A friction force sensing system comprising one interrupter with a blocking extension and one flexible assembly having a fixed end and a free end, longitudinal flexures extending between said fixed end and said free end, said interrupter and said flexible assembly being fixedly connected to each other by a mounting element at the free end of said flexible assembly.

15 Claims, 4 Drawing Sheets

(56) References Cited

U.S. PATENT DOCUMENTS

| | | | | |
|---|---|---|---|---|
| 5,900,531 A * | 5/1999 | Mani | G01N 19/02 | 73/9 |
| 6,094,967 A * | 8/2000 | Cavdar | G01N 19/02 | 73/9 |
| 6,324,918 B1 * | 12/2001 | Gitis | G01L 1/2206 | 73/862 |
| 6,363,798 B1 * | 4/2002 | Gitis | G01L 1/2243 | 73/862.381 |
| 6,615,640 B2 * | 9/2003 | Ahn | G01N 19/02 | 73/9 |
| 7,614,275 B2 * | 11/2009 | Lin | G01N 19/02 | 73/9 |
| 8,151,625 B2 * | 4/2012 | Ebrecht | G01N 19/02 | 73/9 |
| 8,392,023 B2 * | 3/2013 | Duchaine | G01L 1/24 | 318/568.18 |
| 8,646,344 B2 * | 2/2014 | Israelachvili | G02B 21/26 | 73/864.91 |
| 8,646,345 B2 * | 2/2014 | Israelachvili | G01N 1/00 | 73/864.91 |
| 8,789,430 B2 * | 7/2014 | Nevshupa | G01N 3/46 | 73/862.541 |
| 9,541,491 B2 * | 1/2017 | Rounds | G01N 19/02 | |
| 9,581,534 B2 * | 2/2017 | Adams, Jr. | G01N 19/02 | |
| 9,702,809 B2 * | 7/2017 | Wolf | G01N 11/00 | |
| 9,989,428 B2 * | 6/2018 | Vinogradov-Nurenberg | G01L 1/26 | |
| 10,024,776 B2 * | 7/2018 | Khosla | G01B 9/02 | |
| 10,132,733 B2 * | 11/2018 | Vinogradov-Nurenberg | G01N 3/56 | |
| 10,151,684 B2 * | 12/2018 | Ganguli | G01N 19/02 | |
| 10,302,549 B2 * | 5/2019 | Yamada | B66B 31/02 | |
| 10,429,284 B1 * | 10/2019 | Nation | G01N 19/02 | |
| 10,545,086 B2 * | 1/2020 | Abe | G01N 19/02 | |
| 10,775,265 B2 * | 9/2020 | Dowgwillo | G01M 9/04 | |
| 10,788,476 B2 * | 9/2020 | Hamer | G01N 11/00 | |
| 10,809,169 B2 * | 10/2020 | Ma | G01N 3/32 | |
| 10,890,522 B2 * | 1/2021 | Arakawa | G01M 17/02 | |
| 10,908,069 B2 * | 2/2021 | Carpick | G01Q 60/26 | |
| 11,067,489 B2 * | 7/2021 | Sotta | G01N 3/56 | |
| 2004/0089053 A1 * | 5/2004 | Kaminski | G01N 19/02 | 73/9 |
| 2004/0187556 A1 * | 9/2004 | Abe | G01N 19/02 | 73/9 |
| 2006/0196705 A1 * | 9/2006 | Hopkins | G01G 3/08 | 177/229 |
| 2007/0169539 A1 | 7/2007 | Fujii et al. | | |
| 2011/0129320 A1 | 6/2011 | Duchaine et al. | | |
| 2020/0141862 A1 * | 5/2020 | Takashima | G01L 5/00 | |
| 2022/0011150 A1 * | 1/2022 | Trakhimovich | G01G 3/141 | |

* cited by examiner

FORCE SENSOR FOR MEASURING STATIC AND DYNAMIC FRICTION COEFFICIENTS

CROSS REFERENCES TO THE RELATED APPLICATIONS

This application is the national phase of International Application No. PCT/TR2017/050616, filed on Nov. 30, 2017, the entire contents of which are incorporated herein by reference.

TECHNICAL FIELD

The invention presented hereby generally concerns a force sensor that is specially envisioned to act as a sensor for measuring friction force and determining the friction coefficient of said friction force between two specimens of different material properties.

BACKGROUND

From a technical perspective, tribology and specifically friction are phenomena of paramount importance in virtually any and all engineering applications, since interfacing surfaces of materials cannot conceivably move in a space where intermolecular forces are nonexistent. A certain level and presence of friction is mandatory for any kind of motion to take place. Different materials have different frictional characteristics, properties of which must be ascertained and scrutinized thoroughly in order for them to be considered for their proper areas of use. Moreover, for many industrial applications from conveyor lines to robotic arms, force sensors are widely utilized.

Force sensing is in itself a communication method and peripheral feedback utility, such as the ones included in prior art publications. Force sensors provide feedback to automatized processes, ensuring different steps are taken sensitive to peripheral changes. However, force sensing methods can be modified or refined to serve specific ends such as the detection of even the most minuscule amounts of friction. A prominent example would be the case of wing design of aircraft such as commercial airplanes. Main wings of commercial airliners also serve as the fuel depot, and shall retain a certain amount of flexibility in order to withstand large G forces. Once airplanes reach the cruising altitude, however, ice begins to form on the surface of the wings, reducing flexibility greatly and diminishing maneuverability. To prevent this, outer surface of the wings is covered with a special type of polymer that has very small friction so that ice cannot build up on top of it.

Present invention is conceived to address this problem specifically: The main purpose of the present invention is to detect friction forces in millinewton ranges and to measure the coefficient of friction between the interacting surfaces of two specimens. Detection of force in a command space has been performed in different ways. A prior art document referred to with the publication number US2011129320 defines as such for robot control; a photointerrupter based force sensing handle based on flexure as the main object of said disclosure. Robotic handling that is mentioned in the patent reference is attached to 3 different force sensing modules which determine the forces applied on the robotic handle.

Another prior art document with the publication number KR20140125059 discloses an invention of a single position, photointerrupter-utilizing force sensor. The working principle of this force sensor is based on the usage of a photo-interrupter horizontally place underneath a plate. However the design and complexity, as well as application thereof is of limited complexity and therefore limited to sensing, and not measurement.

In the first prior art document, the invention utilizes a force sensing technique, which is based on a photointerrupter blockage, as opposed to purely strain gauge-based methods applied in other industrial examples, none of which are intended to solely detect and measure friction simultaneously in millinewton range; it is envisioned to work in the immediate robotic setting it is a greater part of. In addition, second prior art has no data acquisition means for measurement and processing, which illustrates the shortcomings unto itself.

A primary object of the present invention is to provide a system for the sensitive detection and measurement of the friction force acting between two different types of material.

SUMMARY

Basic principle of the friction sensor rests on the premise that, a displacement or perturbance caused by an object in a sensory element calibrated appropriately to deduce force causing the displacement of the said object may be used to develop a friction sensing mechanism.

A photointerrupter sensor is an electronic device which consists of a light emitter, a light transmitter and a light-sensitive receiver. The beam of light travels across a gap and is picked up by the receiver on the other end of the said gap. This transparent gap can be disturbed by an interrupter which can change the photo-transistor output, resulting in a means to deduce environmental changes caused by an external force, in this case the force acted upon a force application point by a test specimen.

The central part of the invention preferably consists of two monolithically manufactured parts, one photointerrupter and one mounting element. This setup is mounted on a vertical surface with the intention of maintaining stability. The measurement system is in contact with a certain first specimen situated on a disk rotating around an axis going through its center, surface of which is covered by another certain second specimen.

Movement of the object which is the first specimen is horizontal, therefore compliant with the resilience of the mounted piece. Rotating disk is covered with another specimen the friction characteristics between which and the first specimen is to be examined, e.g. first specimen being an ice block and the second being the polymer considered for wing coating.

BRIEF DESCRIPTION OF THE DRAWINGS

Accompanying drawings are given solely for the purpose of exemplifying a friction force sensor, whose advantages over prior art were outlined above and will be explained in brief hereinafter.

The drawings are not meant to delimit the scope of protection as identified in the claims nor should they be referred to alone in an effort to interpret the scope identified in said claims without recourse to the technical disclosure in the description of the present invention.

REFERENCE LIST

Figure 1:
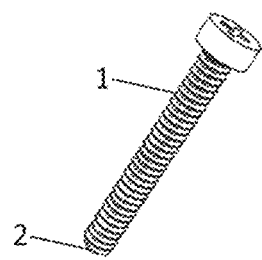
FIG. 1 demonstrates a mounting element holding the resilient and non-resilient parts of a preferred embodiment together according to the present invention.
Figure 2:
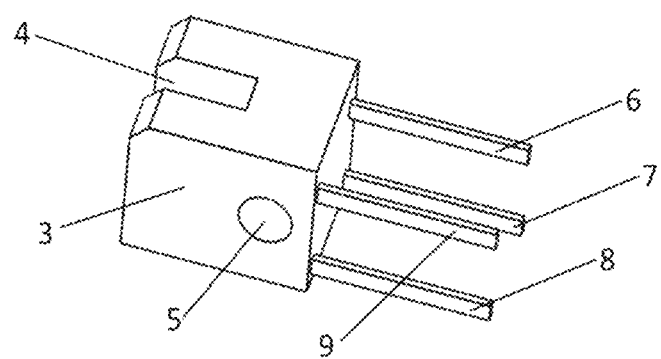
FIG. 2 demonstrates isometric view of the photointerrupter sensor according to the present invention.
Figure 3:
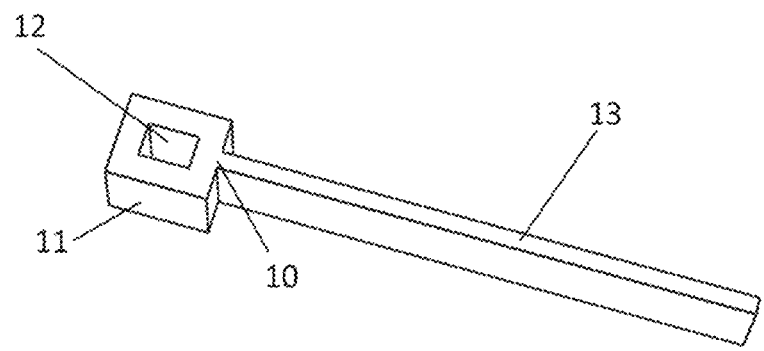
FIG. 3 demonstrates isometric view of the interrupter according to the present invention.
Figure 4:
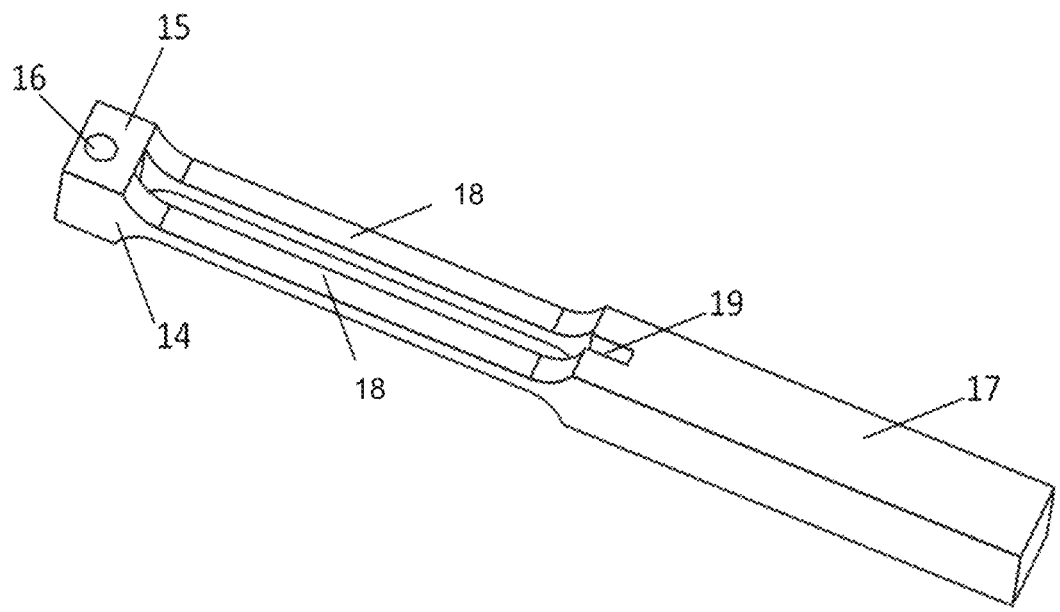
FIG. 4 demonstrates isometric view of the flexures between fixed and free ends of the flexible assembly according to the present invention.
Figure 5:
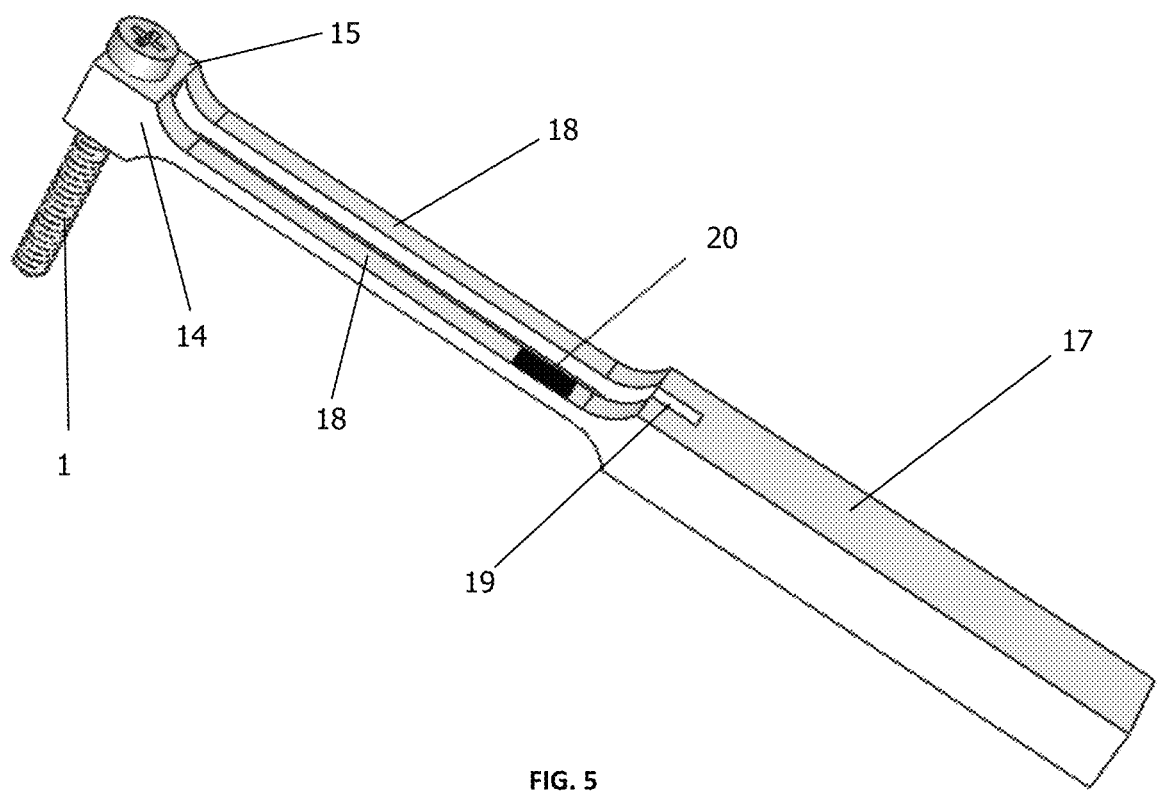
FIG. 5 demonstrates isometric view of the strain gauge based sensor unit in its entirety according to the present invention.
Figure 6:
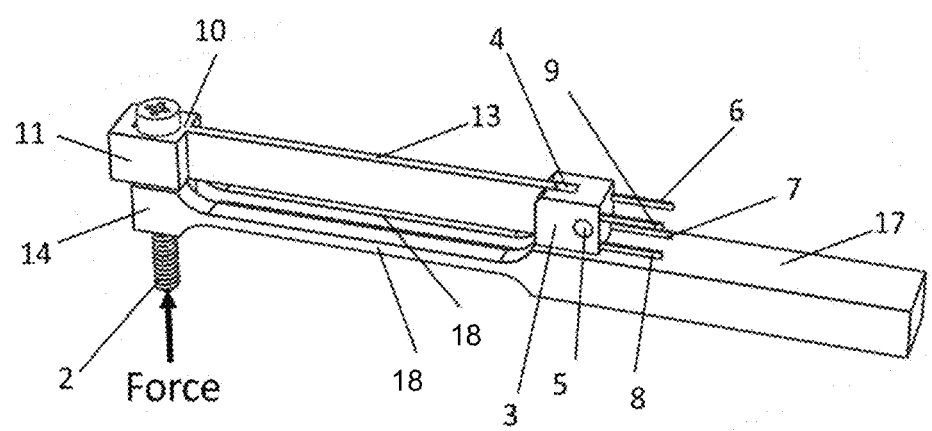
FIG. 6 demonstrates isometric view of the photointerrupter based sensor unit in its entirety according to the present invention.
Figure 7:
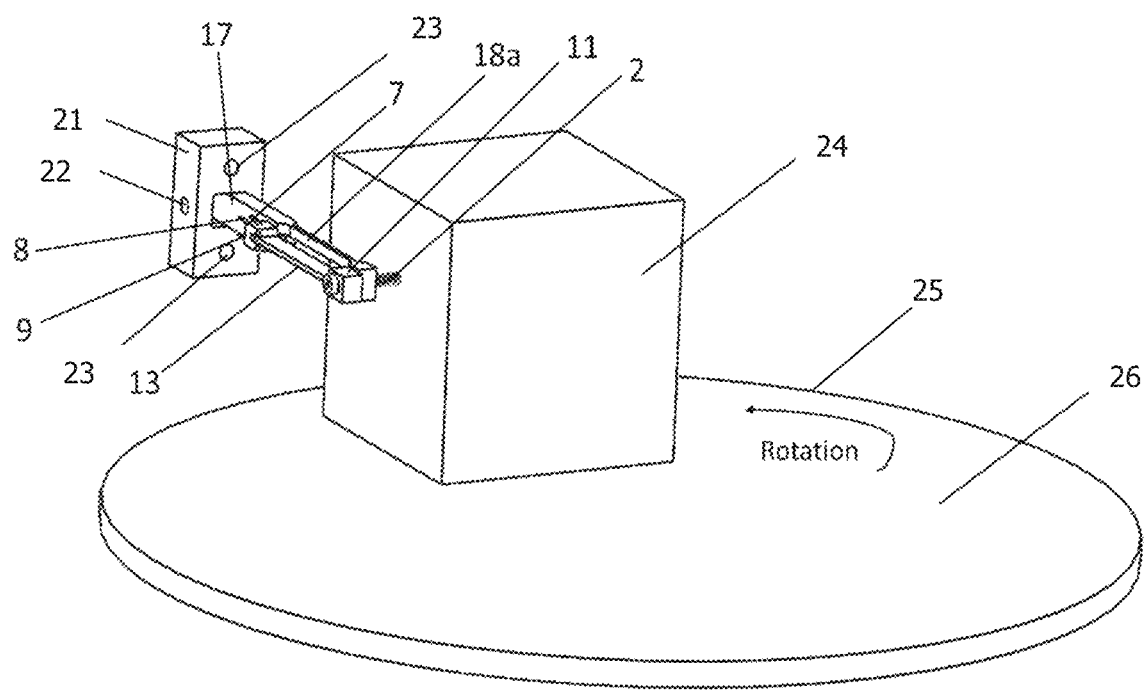
FIG. 7 demonstrates isometric view of a preferred embodiment of the present invention, together with specimens 1 and 2 along with the mounted sensor unit.

1. Mounting element.
2. Force application point.
3. Photointerrupter sensor.
4. Light transmission gap.
5. Mounting hole.
6. Cathode.
7. Anode.
8. Collector.
9. Emitter.
10. Interrupter.
11. Support means.
12. Mounting housing.
13. Blocking extension.
14. Flexible assembly.
15. Free end.
16. Threaded hole.
17. Fixed end.
18. Flexures.
19. Interrupter repositioning slot.
20. Strain gauge sensor.
21. Mounting fixture.
22. Mounting hole.
23. Fastening slots.
24. First test specimen.
25. Rotary plate.
26. Second test specimen.

DETAILED DESCRIPTION OF THE EMBODIMENTS

The present invention discloses a friction force sensor comprising a flexible assembly (14) having one fixed end (17) and one free end (15) with flexures (18) separated with a slot cut. A mounting housing (12) integral to a blocking extension (13) allows a mounting element (1) to be attached to said flexible assembly (14).

The flexible assembly (14) is designed with an interrupter repositioning slot (19) between its fixed (17) and free (15) ends so as to accommodate the interrupter (10) firmly. Said interrupter repositioning slot (19) is the end portion of the slot cut and is used when the interrupter blocking extension (13) is needed to be repositioned due to excessive bending of the flexures (18).

Alternatively, a strain gauge sensor (20) is placed on either one of the symmetrical flexures (18) at sides neighboring the fixed end (17) of the flexible assembly (14), through the bending of which, the resistance of the said strain gauge sensor (20) changes, causing a perturbation on the current carried thereon, giving the opportunity to be interpreted as a force acting on the force application point (2) of the sensor system.

Photointerrupter sensor (3) is attached/glued to the edge of the fixed end (17) that faces the flexures (18). Interrupter (10), which is connected to the flexible assembly (14) with the use of a mounting element (1) comprises said blocking extension (13) facing the fixed end (17) of the flexible assembly (14) and inserted straight into the photointerrupter sensor (3), by which sensing is effectuated with the deflection of the tip of the said interrupter (10) within the photointerrupter sensor (3).

Said friction force sensor is attached/mounted to a fixture (21) on a vertical surface to form an assembly by its fixed end (17) side, while the free end (15) side allows to deflect under the applied force. Two types of threaded holes (mounting hole (22), fastening slot (23)), one for fastening the assembly to the fixture (21) and one for mounting the fixture (21) to a vertical surface exist. Situated beneath the mounted sensor assembly is the rotary plate (25) with a second test specimen (26) appropriately positioned on top of which the first test specimen (24) in contact with the sensor unit's force application point (2).

The flexible assembly (14) is preferably monolithically manufactured from a desired type of material in compliance with the measuring surface. Two symmetrically shaped rectangular flexures (18) are cut to form an inner space extending to the interrupter repositioning slot (19), which lie long enough to accommodate the deflection of the interrupter (10). Fixed end (17) side of the part is used to attach the sensor to the flexible assembly (14) while the free end (15) side allows deflection under the force applied by the first test specimen (24).

The interrupter (10) is also preferably manufactured using a desired type of material, however it is apt to denote here that steel and titanium alloys are also considerable alternatives. Preferably rectangular cross-section blocking extension (13) of interrupter (10) moves back and forth under the applied force at the force application point (2), which interrupts the light transmission in the photointerrupter sensor (3). The mounting housing (12) in the support means (11) of said interrupter (10) provides the adjustment of the position of the blocking extension (13) with respect to the photointerrupter sensor (3), in addition to attaching the interrupter (10) to the flexible assembly (14) via said mounting element (1).

Along with rotary plate (25) covered with the second test specimen (26) and the first test specimen (24) on top of it, friction force measurement can be performed by the sensor unit comprising the interrupter (10), the flexible assembly (14) and the photointerrupter sensor (3). For this, a photointerrupter sensor (3), such as RPI 131 manufactured by Mouser Electronics (Trade name) can be used. The photointerrupter sensor rests glued on top of the fixed end (17) of the flexible assembly (14) in continuous interaction with the interrupter (10). The interrupter (10), the tip of the blocking extension (13) of which is stationed in the gap of the photointerrupter sensor (3), is displaced whenever a force of any magnitude acts on the force application point (2) of the mounting element (1), the latter connecting said flexible assembly (14) to said interrupter (10). When force acts on as stated previously, the tip of the blocking extension (13) deflects inside the photointerrupter sensor's (13) cavity, disrupting the light transmission therein. Changing signal produces a change in current, which provides the basis for ascertaining the magnitude of the friction force with the aid of calibration made beforehand.

The mounting element (1) connects said interrupter (10) to the flexible assembly (14), inserted into the threaded hole (16) that accommodates it appropriately. It is fixedly attached when its head portion touches the mounting housing (12) of the interrupter (10) at the height of its corresponding end, producing a tight grip to keep them together. The free end of the mounting element (1), which is the force application point (2) protrudes off the bottom by an unspecified length. First test specimen (24) enacts a force on said free end of the mounting element (1), i.e. at the force application point (2), causing the flexible assembly (14) to bend at the flexures (18) by a certain amount which tilts its free end (15) backwards.

Tilted flexures (18) along with the bent free end (15) disrupt the positional axis of the interrupter (10), causing the tip of its blocking extension (13) to deflect inside the transparent gap of the photointerrupter sensor (3), which, in turn, disturbs the light picked up by the light sensitive photo-transistor therein. Current generated by the said photo-transistor is representative of the amount of the tip portion's displacement as the maximum amount of blockage of the LED light ranges from 0% to 100%. Therefore, an electronic control unit is able to calculate the exact amount of blockage in accordance with the final position of the blocking extension's (13) tip integral to said interrupter (10), translating it into the amount of force acting on the force application point (2).

Rotary plate (25) with second test specimen (26) lies on a horizontal surface, with the first test specimen (24) situated on top of its disk, rotating with a constant radial velocity. As soon as the first test specimen (24) is in contact with the force application point (2) of the sensor, flexures (18) begin to bend with the said first test specimen (24) retaining inertia. Once friction force is overcome, first test specimen (24) comes to a halt, with the rotary plate (25) with second test specimen continuing its rotation however still, meaning the force acting on the force application point (2) is equal to the friction force between the touching surfaces of the first test specimen (24) and said rotary plate (25) with second test specimen (26).

In a nutshell, the present invention proposes a friction force sensor having two preferably monolithically manufactured parts, one being the interrupter (10) and the other, said flexible assembly (14), connected by means of a mounting element (1) and a photointerrupter sensor (3) positioned at the fixed end (17) side of the top surface of the said flexible assembly (14); or strain gauge sensor (20) is placed on either one of the symmetrical flexures (18) at sides neighboring the fixed end (17) of the flexible assembly (14); mounting fixture (21) and mounting holes (22) are used to attach these parts, with the first test specimen (24) and the rotary plate (25) below being coated with the second test specimen (26) it lies thereon.

In one aspect of the present invention, a friction force sensing system is proposed comprising one flexible assembly (14) having a fixed end (17) and a free end (15), longitudinal flexures (18) extending between said fixed end (17) and free end (15), with a mounting element (1) at the free end (15) of said flexible assembly (14).

In a further aspect of the present invention, said friction force sensing system further comprises sensor unit in connection with the said flexible assembly (14) in the manner that a free end of said mounting element (1) provides a force application point (2) for the measurement of friction forces.

In a further aspect of the present invention, two symmetrical flexures (18) extend between said fixed end (17) and free end (15) of the flexible assembly (14).

In a further aspect of the present invention, a strain gauge sensor (20) is placed on either one of the symmetrical flexures (18) at sides neighboring the fixed end (17) of the flexible assembly (14).

In a further aspect of the present invention, a photointerrupter sensor (3) is attached on the fixed end (17) of the flexible assembly (14).

In a further aspect of the present invention, an interrupter (10) with a blocking extension (13) in a structural relation with the flexible assembly (14) is provided such that said blocking extension (13) extends into a gap portion of said flexible assembly (14) such that deflection of the said interrupter (10) within the photointerrupter sensor (3) enables the measurement of friction forces.

In a further aspect of the present invention, the interrupter (10) comprises a support means (11) for fixedly accommodating said mounting element (1) connecting said support means (11) to the free end (15) of said flexible assembly (14).

In a further aspect of the present invention, the photointerrupter sensor (3) is an optocoupler sensor. The optocoupler sensor used in the invention can preferably be a substantially small size unit which can operate at low temperatures. Such units being of preference in view of their low price tags notwithstanding, it is to be noted that alternative photointerrupters that can fulfill the desired function according to the invention can also be of use.

In a further aspect of the present invention, the said interrupter (10) is attached to said free end (15) via a mounting element.

In a further aspect of the present invention, the force applied on the tip of said mounting element (1) at a force application point (2) deflects said free end (15) of the flexible assembly (14) and the latter to deflect the flexures (18) thereof.

In a further aspect of the present invention, the flexible assembly (14) is a monolithic body. This provides jointless parts which contributes to the strength.

In a further aspect of the present invention, the interrupter (10) is a monolithic body. By means of such a monolithic body, the strength can be measured more sensitively.

In a further aspect of the present invention, the flexible assembly (14) or the interrupter (10) are manufactured from a group including plastic, aluminum, steel and titanium alloys. As an example, aluminum can be used for measuring the friction of coefficient between ice and polymer surfaces. Other examples are equally possible.

In a further aspect of the present invention, the two symmetrically shaped flexures (18) are sufficiently long to accommodate the movement of said blocking extension (13).

In a further aspect of the present invention, movement of the blocking extension (13) to and fro under the applied force at the force application point (2) interrupts the light transmission in said photointerrupter sensor (3).

In a further aspect of the present invention, the interrupter (10) is a light blocker.

In a further aspect of the present invention, the support means (11) of said interrupter comprises a mounting housing (12) cut within said support means (11), allowing adjustment of the position of the blocking extension (13) so as to extend into said photointerrupter sensor (3).

In a further aspect of the present invention, a friction force measuring method comprising the following steps is proposed: a) fixedly attaching the friction force sensing system of the invention to a vertical surface, b) rotating a horizontally extending rotary plate (25) coated with the second specimen (26) with a first test specimen (24) placed on top of the same, c) measuring friction force between said first test specimen (24) and said rotary plate (25) coated with the second specimen (26) when said first test specimen (24) pushes the force application point (2) of the friction force sensing system by way of rotation of the rotary plate (25).

What is claimed is:

1. A friction force sensing system comprising one flexible assembly having a fixed end and a free end, two symmetrical longitudinal flexures extending between said fixed end and said free end, with a mounting element at the free end of said flexible assembly, said friction force sensing system further comprising a sensor unit in connection with said flexible assembly in the manner that a free end of said mounting element provides a force application point for the measurement of friction forces, wherein a slot extends from free end of the flexible assembly to the fixed end of the flexible assembly between the two symmetrical longitudinal flexures, an interrupter repositioning slot is disposed at the fixed end side of the slot, and a single strain gauge sensor is placed on the flexible assembly on either a right symmetrical longitudinal flexure or a left symmetrical longitudinal flexure of one of the symmetrical longitudinal flexures and neighboring the fixed end of the flexible assembly.

2. The friction force sensing system as set forth in claim 1, wherein a photointerrupter sensor is attached on the fixed end of the flexible assembly.

3. The friction force sensing system as set forth in claim 2, wherein an interrupter with a blocking extension in a structural relation with the flexible assembly is provided such that said blocking extension extends into a gap portion of said flexible assembly such that deflection of said interrupter within the photointerrupter sensor enables the measurement of friction forces.

4. The friction force sensing system as set forth in claim 3, wherein the interrupter comprises a support means for fixedly accommodating said mounting element connecting said support means to the free end of said flexible assembly.

5. The friction force sensing system as set forth in claim 4, wherein the support means of said interrupter comprises a mounting housing cut within said support means, allowing adjustment of the position of the blocking extension so as to extend into said photointerrupter sensor.

6. The friction force sensing system as set forth in claim 3, wherein said interrupter is attached to said free end via a screw.

7. The friction force sensing system as set forth in claim 3, wherein the force applied on the tip of said screw at a force application point deflects said free end of the flexible assembly and the latter to deflect the flexures thereof.

8. The friction force sensing system as set forth in claim 3, wherein the interrupter is a monolithic body.

9. The friction force sensing system as set forth in claim 3, wherein the flexible assembly is a monolithic body, and the interrupter is a monolithic body, and wherein the flexible assembly and interrupter are manufactured from a group including plastic, aluminum, steel and titanium alloys.

10. The friction force sensing system as set forth in claim 3, wherein the two symmetrical longitudinal flexures are Gufficicntly long enough to accommodate the movement of said blocking extension.

11. The friction force sensing system as set forth in claim 3, wherein movement of the blocking extension to and for under the applied force at the force application point interrupts the light transmission in said photointerrupter sensor.

12. The friction force sensing system as set forth in claim 3, wherein the interrupter is a light blocker.

13. The friction force sensing system as set forth in claim 2, wherein the photointerrupter sensor is an optocoupler sensor.

14. The friction force sensing system as set forth in claim 1, wherein the flexible assembly is a monolithic body.

15. A friction force measuring method comprising the following steps:
 a) fixedly attaching the friction force sensing system of claim 1 to a vertical surface,
 b) rotating a horizontally extending rotary plate with a first test specimen placed on top of the same,
 c) measuring friction force between said first test specimen and said rotary plate coated with the second specimen when said first test specimen pushes the force application point of the friction force sensing system by way of rotation of the rotary plate.

* * * * *